(12) United States Patent
Parkinson

(10) Patent No.: US 8,904,487 B2
(45) Date of Patent: Dec. 2, 2014

(54) PREVENTING INFORMATION THEFT

(75) Inventor: Steven William Parkinson, Mountain View, CA (US)

(73) Assignee: Red Hat, Inc., Raleigh, NC (US)

(*) Notice: Subject to any disclaimer, the term of this patent is extended or adjusted under 35 U.S.C. 154(b) by 1347 days.

(21) Appl. No.: 11/469,473

(22) Filed: Aug. 31, 2006

(65) Prior Publication Data
US 2008/0060063 A1 Mar. 6, 2008

(51) Int. Cl.
*G06F 7/04* (2006.01)
*G06F 17/30* (2006.01)
*G06F 21/60* (2013.01)
*H04L 29/06* (2006.01)

(52) U.S. Cl.
CPC .......... *H04L 63/1441* (2013.01); *G06F 21/606* (2013.01); *H04L 63/1483* (2013.01); *G06F 2221/2113* (2013.01); *H04L 63/083* (2013.01)
USPC ................................................ 726/4; 705/64

(58) Field of Classification Search
CPC . H04L 63/1483; H04L 63/1408; H04L 63/08; H04L 63/14; H04L 67/02; G06F 21/60
USPC ................................................ 705/64; 726/4
See application file for complete search history.

(56) References Cited

U.S. PATENT DOCUMENTS

| | | | | |
|---|---|---|---|---|
| 6,442,607 B1* | 8/2002 | Korn et al. | .................... | 709/225 |
| 6,662,300 B1* | 12/2003 | Peters | .......................... | 713/182 |
| 7,152,244 B2* | 12/2006 | Toomey | .......................... | 726/26 |
| 7,634,810 B2* | 12/2009 | Goodman et al. | ............... | 726/22 |
| 7,831,915 B2* | 11/2010 | Averbuch et al. | ............. | 715/738 |
| 8,220,047 B1* | 7/2012 | Soghoian et al. | ............... | 726/22 |
| 2003/0037138 A1* | 2/2003 | Brown et al. | ................. | 709/225 |
| 2006/0021031 A1* | 1/2006 | Leahy et al. | .................... | 726/22 |
| 2006/0041759 A1* | 2/2006 | Kaliski et al. | ................. | 713/184 |
| 2006/0070126 A1* | 3/2006 | Grynberg | ........................ | 726/22 |
| 2006/0080542 A1* | 4/2006 | Takeuchi et al. | ............... | 713/182 |
| 2006/0080735 A1* | 4/2006 | Brinson et al. | ................. | 726/22 |
| 2006/0101128 A1* | 5/2006 | Waterson | ...................... | 709/212 |
| 2006/0101334 A1* | 5/2006 | Liao et al. | ..................... | 715/523 |
| 2006/0174119 A1* | 8/2006 | Xu | ............................... | 713/170 |
| 2006/0179005 A1* | 8/2006 | Li et al. | .......................... | 705/64 |
| 2007/0006305 A1* | 1/2007 | Florencio et al. | ............... | 726/22 |
| 2007/0028105 A1* | 2/2007 | Hynek | .......................... | 713/170 |
| 2008/0028441 A1* | 1/2008 | Novoa et al. | ...................... | 726/4 |
| 2008/0141342 A1* | 6/2008 | Curnyn | ............................ | 726/3 |
| 2008/0196085 A1* | 8/2008 | Nagoya et al. | .................... | 726/3 |
| 2008/0307529 A1* | 12/2008 | Choi et al. | ....................... | 726/26 |
| 2010/0023750 A1* | 1/2010 | Tan | ............................... | 713/150 |

OTHER PUBLICATIONS

Freier et al. "The SSL Protocol Version 3.0" http://www.mozilla.org/projects/security/pki/nss/ssl/draft302.txt, Nov. 18, 1996.*

(Continued)

*Primary Examiner* — Michael Simitoski
(74) *Attorney, Agent, or Firm* — Lowenstein Sandler LLP

(57) ABSTRACT

An embodiment generally relates to a method of preventing information theft. The method includes receiving access information including a password, comparing the access information to stored access information, and verifying a destination of the access information to determine if the destination is valid for the access information. The access information is transmitted based on the comparison to the stored access information and the verification of the destination.

11 Claims, 7 Drawing Sheets

(56) References Cited

OTHER PUBLICATIONS

Franco, "Principles behind IE7's Phishing Filter" IEBlog, http://blogs.msdn.com/ie/archive/2005/08/31/458663.aspx, Aug. 31, 2005.*

Wu, Min et al. "Web Wallet: Preventing Phishing Attacks by Revealing User Intentions", Jul. 12, 2006.*

Ross, Blake et al. "Stronger Password Authentication Using Browser Extensions", 2005.*

* cited by examiner

550

| User name | Password | Destination |
|---|---|---|
| John Doe | Secret | www.abcbank.com |
| JDoe | 123456 | www.mfunds.com |
| John.Doe | Doe123 | www.irs.gov |
| Doej | 123secret | www.dmv.state.gov |
| John doe | Dkaielsa | www.mail.com |

FIG. 5B

PREVENTING INFORMATION THEFT

FIELD

This invention relates generally to security systems and methods.

DESCRIPTION OF THE RELATED ART

Access to most computer systems and applications require a user to establish a user account and to enter access information such as a username and password. A user's password is maintained in secret to prevent unauthorized access using the password. To gain unauthorized entry to a computer system, attackers often mimic or "fake" known applications and websites. Attackers display a false application or website that closely resembles the true application or website. Unwittingly, the user enters their access information into the false application because the resemblance. By "faking" the true application or website, attackers can obtain sensitive user access information such as the password.

BRIEF DESCRIPTION OF THE DRAWINGS

The accompanying drawings, which are incorporated in and constitute a part of this specification, illustrate one embodiment of the invention and together with the description, serve to explain the principles of the invention.

FIGS. 5A-C are diagrams illustrating an exemplary application window consistent with embodiments of the present disclosure.

DETAILED DESCRIPTION OF EMBODIMENTS

To gain unauthorized entry to a computer system, attackers often mimic or "fake" known applications and websites in order to induce a user to enter sensitive access information. According to embodiments of the present disclosure, information theft is prevented by comparing access information to stored access information. If the access information matches stored access information, the destination of the access information is verified before the access information is transmitted. For example, the destination of the access information may be verified as the true destination for the access information. If the destination does not verify, the transmission of the access information is prevented.

According to other embodiments, the password of the access information is compared with stored passwords. If the passwords matches stored passwords, the destination of the access information is verified before the access information is transmitted. For example, the destination of the password may be verified as the true destination for the password. If the destination does not verify, the transmission of the access information is prevented.

Reference will now be made in detail to the exemplary embodiments of the invention, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Figure 1:
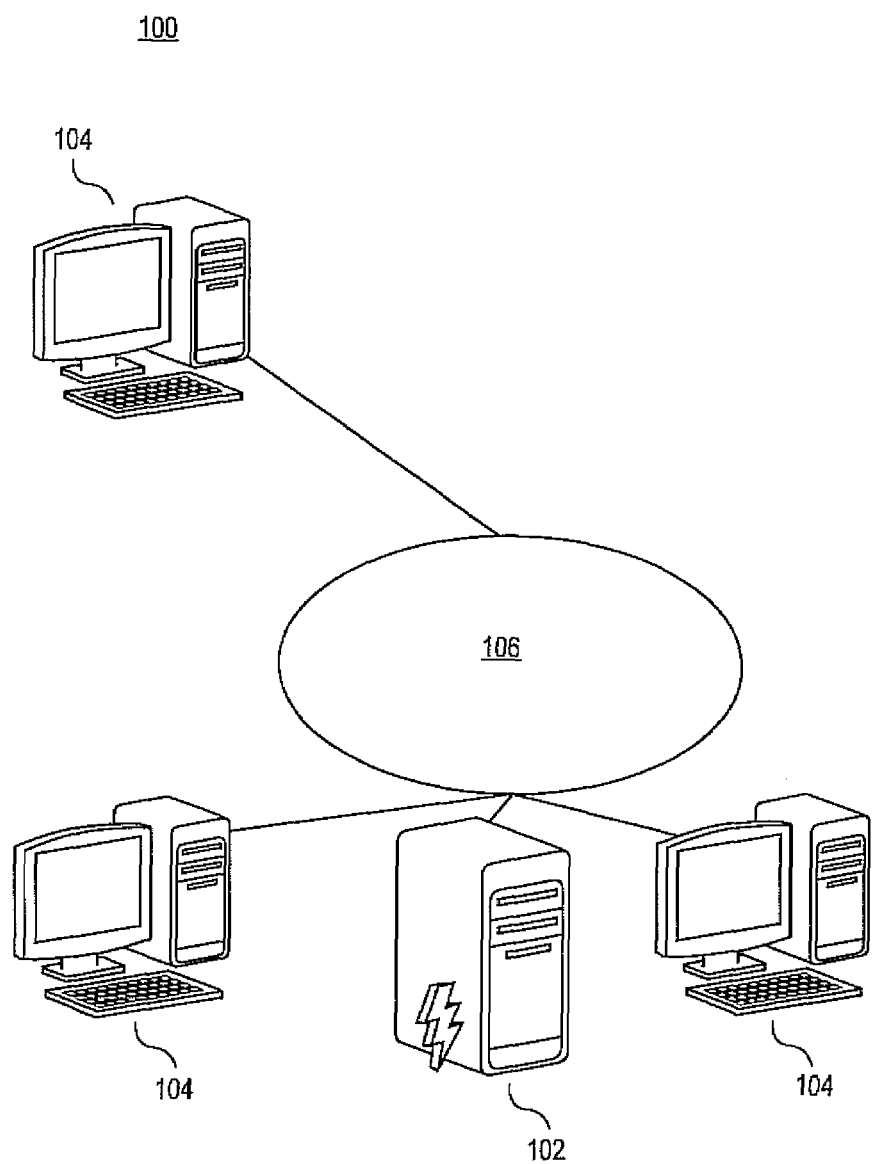
FIG. 1 is a diagram illustrating an exemplary network system consistent with embodiments of the present disclosure.

According to embodiments of the present disclosure, information theft is prevented by comparing access information to stored access information. FIG. 1 is a diagram illustrating a network system 100 in which the information theft may be prevented. System 100 may include a server 102 and clients 104. Server 102 and clients 104 may be interconnected via a network 106. Network 106 may be any type of network such as an internet, the Internet, a wide area network, or a local area network. FIG. 1 shows system 100 including three clients and one server connected via a single network. One skilled in the art will realize that system 100 may include any number of clients and servers connected via multiple networks.

Server 102 may be a computing machine or platform configured to execute a network system through an operating system in conjunction with clients 104. Server 102 may send data to clients 104 and receive data from clients 104. Server 102 may be configured to host secure destinations, such as SSL websites. Server 102 may be implemented with any known server platforms such as those from Intel, Advanced Micro Devices, Hewlett-Packard, etc. One skilled in the art will realize that the above server systems are exemplary and server 102 may be implemented in any known platform.

Clients 104 may be computing machines or platforms configured to execute applications to perform methods for preventing information theft. Clients 104 may implements network application such as web browsers. Clients 104 may be implemented with personal computers, workstations, thin clients, thick clients, or other similar computing platforms. Clients 104 may use operating systems such as Linux, Windows, Macintosh or other available operating systems. One skilled in the art will realize that the implementations of clients 104 are exemplary and clients 104 may be implemented in any type of computer system.

Figure 2:
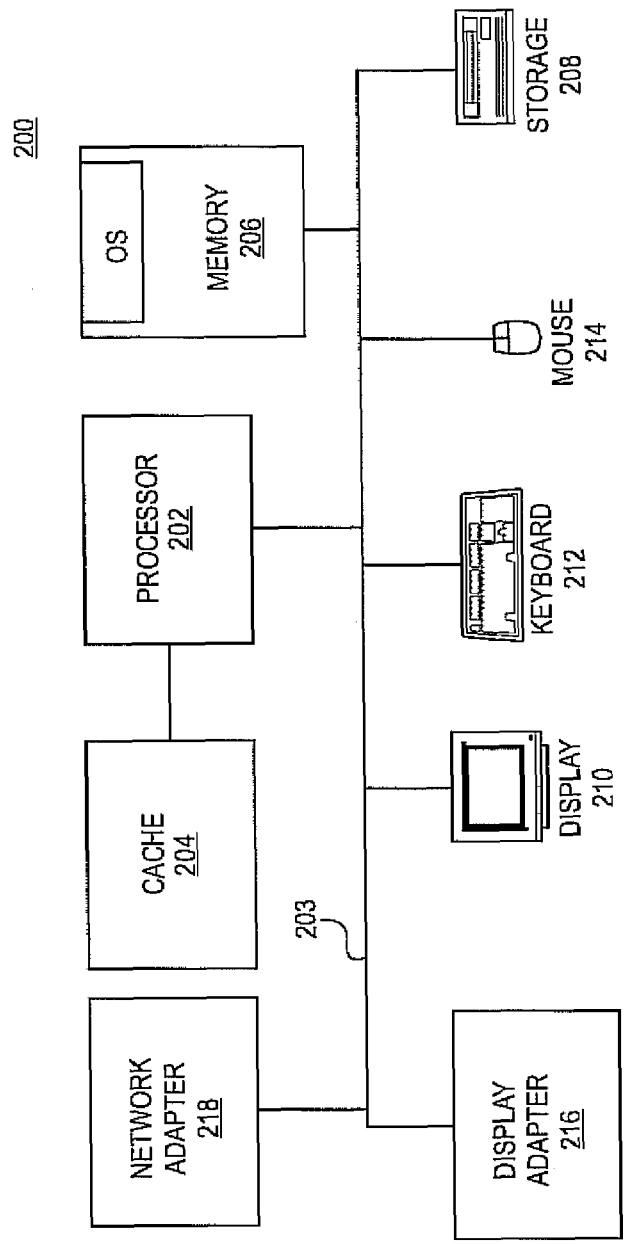
FIG. 2 is a diagram illustrating an exemplary computing platform consistent with embodiments of the present disclosure.

FIG. 2 is a block diagram of an exemplary computing platform 200 capable of performing embodiments of the present disclosure. Computing platform 200 may be utilized as clients 104 and server 102. The methods for preventing information theft may be implemented in an application written in program code and executed by the computing platform 200. The application may be implemented in computer languages such as PASCAL, C, C++, JAVA, HTML and the like. For example, when a SSL website is being accessed, a web browser, such as Explorer, Firefox, etc., may be executed on computing platform 200. One skilled in the art will realize that the methods for preventing information theft may be implemented in any computer language and any application capable of establishing a network connection.

As shown in FIG. 2, the computing platform 200 may include one or more processors such as the illustrated processor 202 that provide an execution platform for embodiments of the of the present disclosure. Processor 202 may be connected to a cache 204 to serve as a working memory. Commands and data from the processor 202 may be communicated over a communication bus 203.

Computing platform 200 may include a main memory 206, such as a Random Access Memory (RAM), where the operating system and applications implementing the methods described above may be executed during runtime. Main memory 206 may be coupled to communication bus 203.

Computing platform 200 may include one or more secondary memories 208. Secondary memories may be coupled to communications bus 203. The secondary memories 208 may include, for example, a hard disk drive and/or a removable storage drive, representing a floppy diskette drive, a magnetic tape drive, a compact disk drive, and the like, where a copy of a computer program embodiment for applications for preventing information theft may be stored. The secondary memories 208 may read from and/or write to between themselves in a well-known manner.

Computing platform 200 may also include a keyboard 212, a mouse 214, and a display 210 for allowing a user to interface with computing platform 200. Keyboard 212, mouse 214, and display 210 may be coupled to communications bus 203. Computing platform 200 may also include a display adapter 216. Display adapter 216 may be coupled to communication bus 203. Display adapter 216 can interface with the communication bus 203 and the display 210 and can receive display data from the processor 202 and converts the display data into display commands for the display 210.

Computing platform 200 may also include a network adapter 218. Network adapter 218 may be coupled to communication bus 203. Network adapter 218 may allow computing platform 200 to send and receive data via a network, such as network 106.

According to embodiments of the present disclosure, any of the methods for preventing information theft can be embodied on a computer readable storage medium as instruction for causing a computer platform to perform the instructions. The computer readable storage medium may include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software programs of the computer program on a CD-ROM or via Internet download. In a sense, the Internet itself, as an abstract entity, is a computer readable medium. The same is true of computer networks in general.

Figure 3:
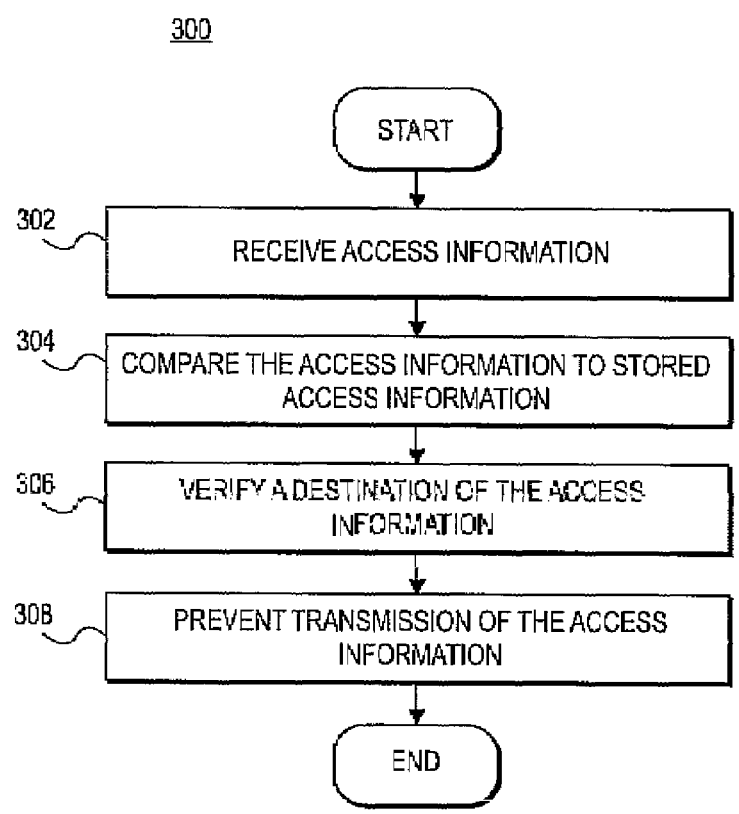
FIG. 3 is a flow diagram illustrating a method for preventing information theft consistent with embodiments of the present disclosure.

FIG. 3 is a flow diagram illustrating a method 300 for preventing information theft consistent with embodiments of the present disclosure. Method 300 prevents information theft by comparing access information to stored access information. If the access information matches stored access information, the destination of the access information is verified before the access information is transmitted. For example, the destination of the access information may be verified as the true destination for the access information. If the destination does not verify, the transmission of the access information is prevented.

Method 300 may be implemented in any type of application for granting access executed on a computing platform. For example, method 300 may be performed by a web browser or website hosting application executed on a computing platform. Additionally, method 300 may be performed by a separate application that intercepts the access information prior to reaching the access application. Method 300 may be performed on any computing platform or computing platform in a network system, such as computer platform 200 and network system 100 described below. One skilled in the art will realize that method 300 may be performed on any computing platform in which access to a system requires entry of access information.

As illustrated in FIG. 3, method 300 begins when an application receives an access request (stage 302). The access request may include access information such as a username and password. For example, a user may attempt to input access information to a network application to gain access to a secure website.

Next, prior to transmitting the access information, the application compares the access information to stored access information (stage 304). For example, the username and password of the access information may be compared to stored usernames and passwords of previous utilized access information.

Then, if the access information matches stored access information, the applications verifies the destination of the access information (stage 306). The destination may be verified by confirming that the intended destination of the access information is the true destination. For example, the intended destination may be compared to a destination associated with stored access information.

If the destination does not verify, the application prevents the transmission of the access information (stage 308). Additionally, the applications may transmit a message to the user that indicates the access information has been prevented from being transmitted.

Figure 4:
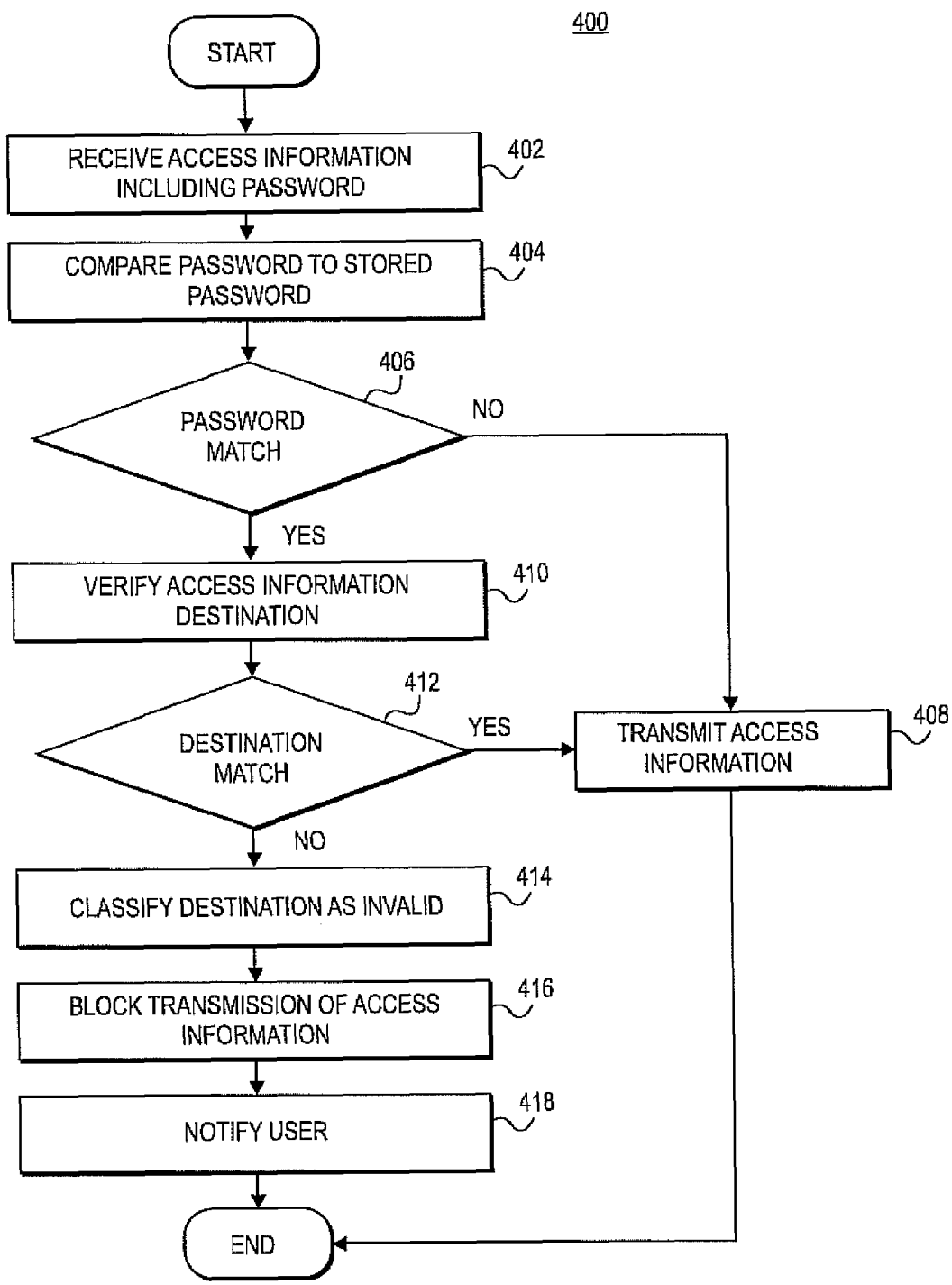
FIG. 4 is a flow diagram illustrating another method for preventing information theft consistent with embodiments of the present disclosure.

FIG. 4 is a flow diagram illustrating a method 400 for preventing information theft consistent with embodiments of the present disclosure. Method 400 prevents information theft by comparing access information to stored access information. Particularly, the password of the access information is compared with stored passwords. If the passwords matches stored passwords, the destination of the access information is verified before the access information is transmitted. For example, the destination of the password may be verified as the true destination for the password. If the destination does not verify, the transmission of the access information is prevented.

Method 400 may be implemented in any type of application for granting access executed on a computing platform. For example, method 400 may be performed by a web browser or website hosting application executed on a computing platform. Additionally, method 400 may be performed by a separate application that intercepts the access information prior to reaching the access application. Method 400 may be performed on any computing platform or computing platform in a network system, such as computer platform 200 and network system 100 described below. One skilled in the art will realize that method 400 may be performed on any computing platform in which access to a system requires entry of access information.

Figure 5A:
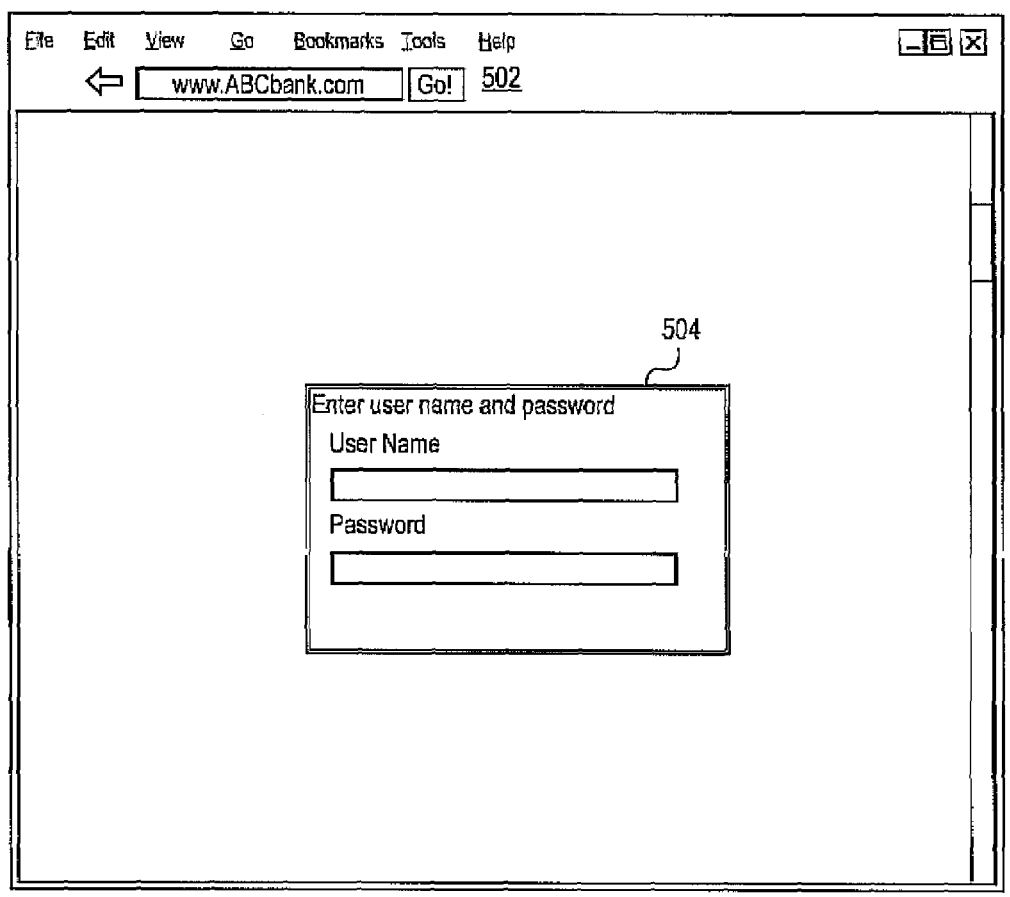

As illustrated in FIG. 4, method 400 begins when the application, for example a network application or separate application, receives access information including a username and password (stage 402). FIG. 5A is diagram illustrating an exemplary browser 500 for gaining access to a secure website. As illustrated in FIG. 5A, a user may gain access to a secure website, for example the website address shown in field 502, by entering a username and password in user interface (UI) 504 in browser 500. The application implementing method 400 may be included in browser 500. Additionally, the application implementing method 400 may be a separate application that intercepts the access information prior to reaching browser 500.

Next, the application compares the password of the access information to stored passwords (stage 404). The passwords may be stored in any form to maintain the passwords for previous utilized access information. FIG. 5B is a diagram illustrating an exemplary password list 550 consistent with embodiments of the present disclosure. As illustrated in FIG. 5B, the passwords may be maintained corresponding to the associated destination of the password.

Then, the application determines if the password matches a stored password (stage 406). If the password does not match, the access information including the password is transferred (stage 408). For example, browser 500 may transfer the access information to the website. Likewise, if the application is separate from browser 500, the application may transfer the password information to browser 500.

If the password does match, the application verifies the access information destination (stage 410). The application verifies the destination by determining if the destination matches the stored destination of the stored password (stage 412). For example, the application may compare the destination stored corresponding to the password in list 500 to the intended destination. If the destination matches, the application transmits the access information (stage 408).

If the destination does not match, the application classifies the destination as invalid (stage 414). The application then blocks transmission of the access information (stage 416). For example, browser 500 may block the transmission of the access information to the website. Likewise, if the application is separate from browser 500, the application may block transmission of the access information to browser 500.

Figure 5C:
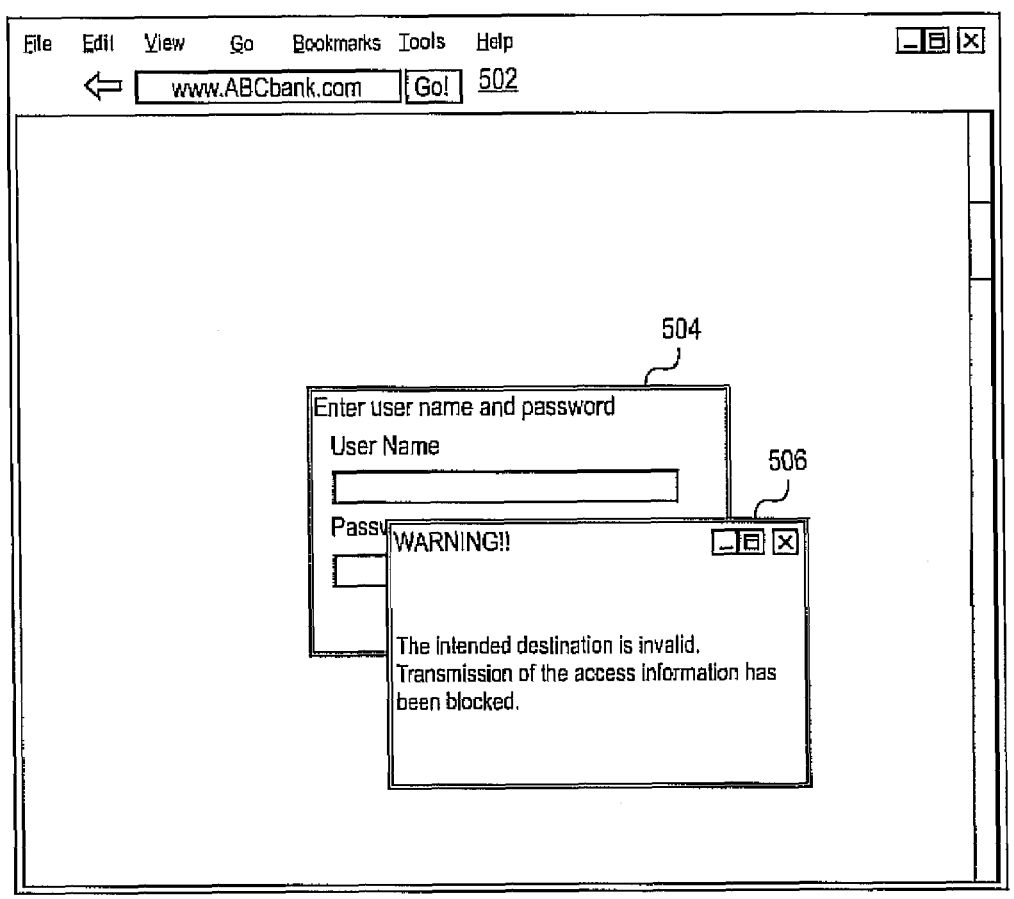

The application may also notify the user of the invalid destination (stage 418). The application may display a message to the user. FIG. 5C is a diagram illustrating an exemplary UI for informing the user of the invalid destination. As illustrated in FIG. 5C, browser 500 may display a UI 506 informing the user that the destination is invalid and the access information has been blocked. If the application is separate from browser 500, the application may notify the user or instruct browser 500 to notify the user.

Method 400 has been described in relation to an exemplary web browser. One skilled in the art, however, will realize that method 400 may be implemented in any application which allows access to a system by requesting the user enter access information.

Other embodiments of the present teaching will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
    storing a list comprising a plurality of entries, each of the plurality of entries comprising a username, a password, and a destination website address;
    intercepting a user's access information for accessing an intended website prior to the user's access information reaching a browser;
    determining, by a processor, that the user's access information matches a username and a password of one of the plurality of entries;
    determining a first website address of the intended website;
    determining a second website address by retrieving the destination website address of the one of the plurality of entries;
    determining whether the first website address matches the second website address; and
    blocking the user's access information from reaching the browser in response to determining that the first website address does not match the second website address.

2. The method of claim 1, wherein the access information comprises a signal received from an input device.

3. The method of claim 2, wherein the input device is a keyboard.

4. The method of claim 1, further comprising verifying authentication information of the intended website.

5. The method of claim 1, further comprising sending a notification of the blocking.

6. A system comprising:
    a memory to store a list comprising a plurality of entries, each of the plurality of entries comprising a username, a password, and a destination website address; and
    a processor to:
        intercept a user's access information for accessing an intended website prior to the user's access information reaching a browser;
        determine that the user's access information matches a username and a password of one of the plurality of entries;
        determine a first website address of the intended website;
        determine a second website address by retrieving the destination website address of the one of the plurality of entries;
        determine whether the first website address matches the second website address; and
        block the user's access information from reaching the browser in response to determining that the first website address does not match the second website address.

7. The system of claim 6, wherein the access information comprises a signal received from a keyboard.

8. The system of claim 6, wherein the processor is further to verify authentication information of the intended website.

9. The system of claim 6, wherein the processor is further to send a notification of the blocking.

10. A non-transitory computer readable medium comprising instructions that, when executed by a processor, cause the processor to perform operations comprising:
    storing a list comprising a plurality of entries, each of the plurality of entries comprising a username, a password, and a destination website address;
    intercepting a user's access information for accessing an intended website prior to the user's access information reaching a browser;
    determining, by the processor, that the user's access information matches a username and a password of one of the plurality of entries;
    determining a first website address of the intended website;
    determining a second website address by retrieving the destination website address of the one of the plurality of entries;
    determining whether the first website address matches the second website address; and
    blocking the user's access information from reaching the browser in response to determining that the first website address does not match the second website address.

11. The non-transitory computer storage medium of claim 10, wherein the operations further comprise verifying authentication information of the intended website.

\* \* \* \* \*